March 2, 1926.　　　　　　　　　　　　　　　　1,575,328
W. L. GILMORE ET AL
AEROPLANE LANDING GEAR
Filed March 26, 1920　　3 Sheets-Sheet 1
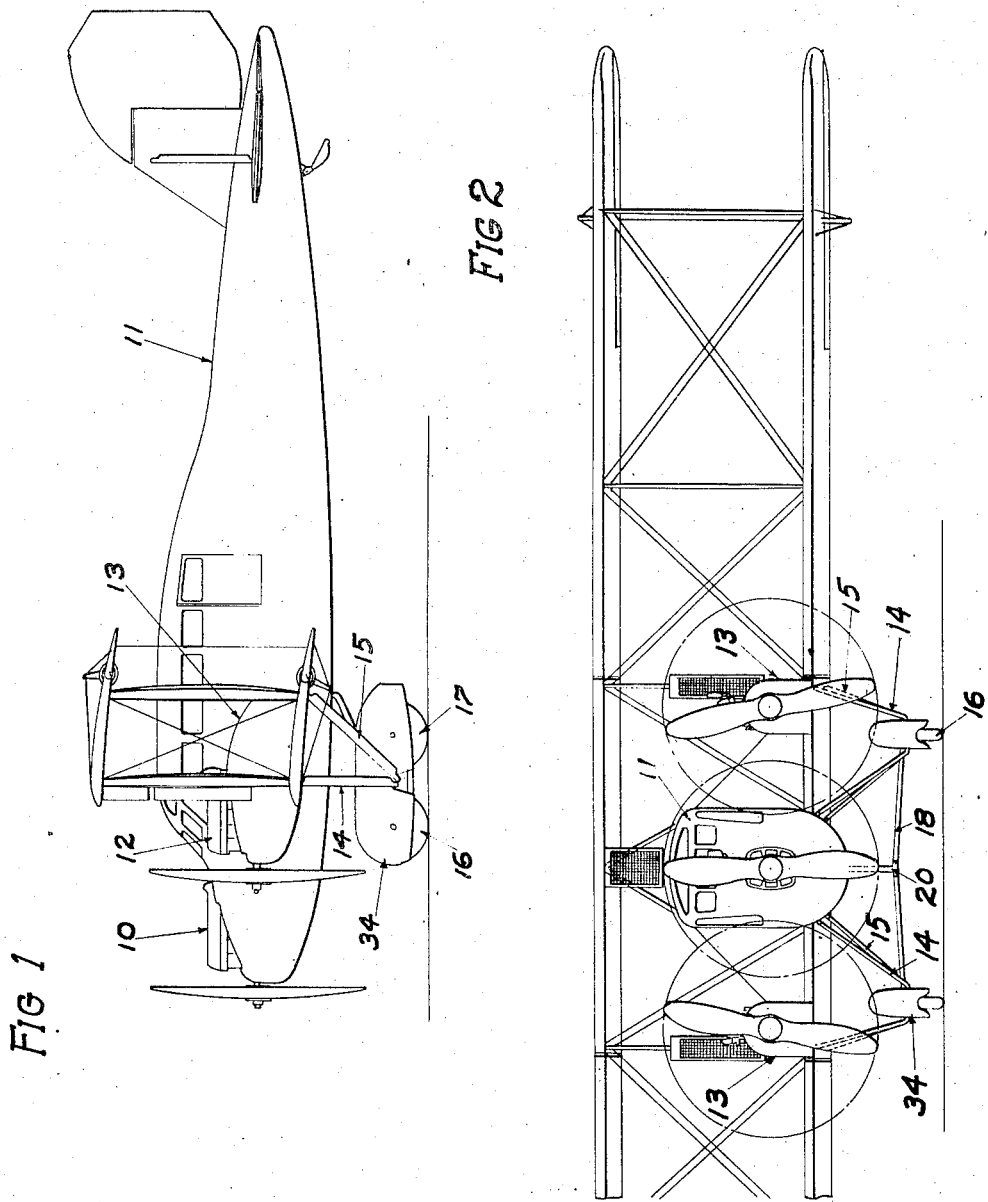
INVENTORS
WILLIAM L. GILMORE & HARVEY C. MUMMERT.
BY
ATTORNEY March 2, 1926.

W. L. GILMORE ET AL 1,575,328

AEROPLANE LANDING GEAR

Filed March 26, 1920   3 Sheets-Sheet 2

INVENTORS
WILLIAM L. GILMORE & HARVEY C. MUMMERT.

BY
Chester H. Braulton
ATTORNEY

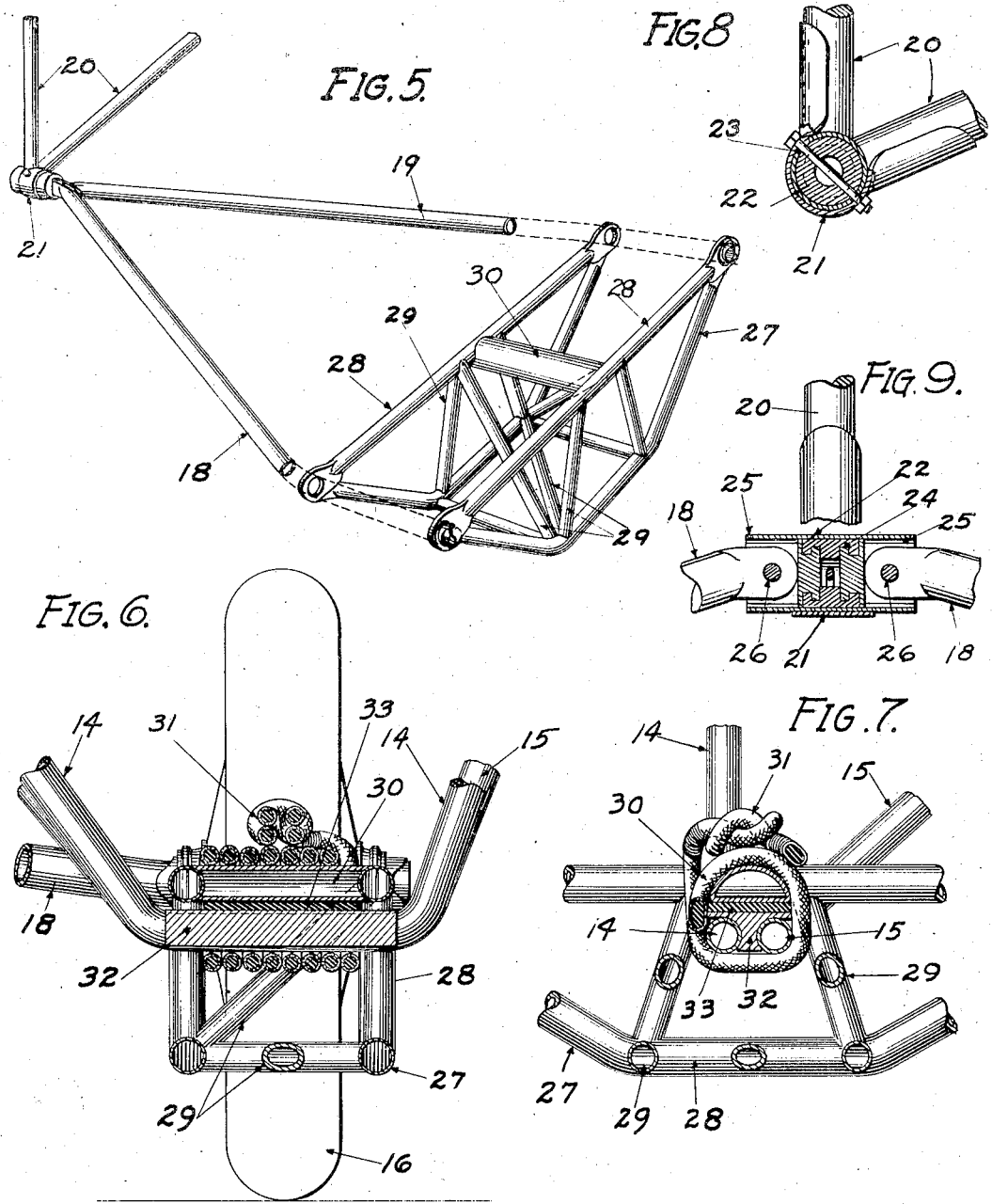

Patented Mar. 2, 1926.

1,575,328

UNITED STATES PATENT OFFICE.

WILLIAM L. GILMORE, OF GARDEN CITY, AND HARVEY C. MUMMERT, OF HOLLIS, NEW YORK, ASSIGNORS, BY MESNE ASSIGNMENTS, TO CURTISS AEROPLANE AND MOTOR COMPANY, INC., OF GARDEN CITY, NEW YORK, A CORPORATION OF NEW YORK.

AEROPLANE LANDING GEAR.

Application filed March 26, 1920. Serial No. 368,816.

*To all whom it may concern:*

Be it known that we, WILLIAM L. GILMORE and HARVEY C. MUMMERT, citizens of the United States, residing, respectively, at Garden City, Nassau County, N. Y., and Hollis, Queens County, N. Y., have invented certain new and useful Improvements in Aeroplane Landing Gears, of which the following is a specification.

Our invention relates to aircraft landing gear and is especially, though not necessarily, adapted to aeroplanes of large sizes, i. e., aeroplanes in which the weight masses are laterally distributed and in which the landing gear is provided with a pair of tandem wheels. In the embodiment of the invention selected for illustration, but two such pairs of tandem wheels are provided. Preferably the tandem wheels are symmetrically arranged beneath and at opposite sides of the fore and aft axis of the fuselage of the body, the struts which support the wheels, being likewise symmetrically arranged and so related to the several weight masses, as to more or less apportion the weight thereof over all of the several wheels. This equal distribution of the weight of the machine over all of the several wheels is an object of the present invention.

A further object of the invention, equally important is the mounting of the wheels upon rocker frames, yieldingly supported, and so related to the several struts as to necessitate the employment of but a single group of shock absorber elastics. The rocker frames are of identical construction. Each frame comprises connected side sections between which the pairs of wheels are supported. The wheels themselves are mounted on axles which in turn are fastened to, and move with the frame and at their inner ends are pivoted to a center strut or other structural element of the machine carried by the fuselage or body. In this way all side swipe stresses are distributed over both sets of wheels and the weight of the machine likewise equally and effectively distributed.

A further characteristic of the invention is the arrangement of the shock absorber mechanism in such manner that the wheels of the tandem pairs are capable of independent yielding movement. Should the forward wheel of either pair come in contact with an obstruction the rocker frame is tilted or displaced against the action of the elastics. This displacement instead of stretching the elastics to an extent equal to the displacement of the wheel only stretches the elastic half the distance of the wheel displacement. The wheel, in being displaced, causes the rocker frame to rock about an axis defined by the axle of the rear or following wheel and since the shock absorber elastics are situated intermediately of or approximately midway between the tandem wheels obviously they (the elastics) are stretched in direct proportion to the distance betwen the elastics and the axes about which the rocker frame is rocked.

A still further characteristic of the invention is the arrangement of the landing gear struts in pairs, each strut being substantially V-shaped and the struts of the separate pairs so arranged that the bight portions of related struts lie closely adjacent. Accordingly the shock absorber elastics may be laced over or under (as the case may be) both struts simultaneously.

Having thus briefly set forth the advantages and objects attained by the present invention it now remains to describe in detail the structural relation of the various parts of the apparatus or device. To this end, reference should be had to the drawings, wherein:—

Figure 1, is a side elevation of an aeroplane having a landing gear of the type herein set forth.

Figure 2, is a front end elevation of the aeroplane illustrated in Figure 1, showing the relation between the weight masses of the machine and the landing gear.

Figure 5, is a detail perspective view of one of the rocker frames and the axle mounting at the ends thereof.

Figure 6, is a detail vertical sectional view of one of the rocker frames showing the shock absorber elastics in place.

Figure 7, is a similar view taken at a right angle to the section of Figure 6.

Figure 8, is a detail sectional view of the sleeve provided at the foot of the center V-strut, and Figure 9, is a similar view taken at a right angle to the section of Figure 8.

The aeroplane herein illustrated is of the biplane multi-motored type. The motors, of which there are three, are symmetrically arranged, one at each side of the fore and aft axis of the craft, and one in the longitudinal vertical plane thereof. The centrally located motor is herein designated at 10. It is enclosed for the major part within the fuselage or body 11. The side motors, designated as 12, unlike the center motor, are enclosed for the major part in side nacelles directly supported upon one of the aeroplane wings. A tractor propeller is driven by each of the several motors.

In view of the lateral distribution of the weight masses incurred through the motor arrangement above disclosed, it is preferred that the strut arrangement of the landing gear be so organized that the wheels forming a part of the landing gear shall collectively and directly sustain a substantial portion of the total weight of the machine. For simplicity but four V-type landing gear struts are provided. These struts are tandemly arranged, two at each side of the fuselage or body. The ends of the struts connect respectively with the fuselage or body and the lower aeroplane wing. Preferably the points of connection between the strut ends and the aeroplane wing are so related to the side nacelles 13 as to directly apportion the weight of the motors 12 over the total number of landing gear struts. The V-arrangement of the struts from all angles should be noted. The struts themselves are V-arranged when viewed from either the rear or front, while the pairs of struts are V-arranged when viewed from either side. As the structural simplicity and strength of V-type struts is well known, it is desirable that this arrangement be followed out.

Figure 3:
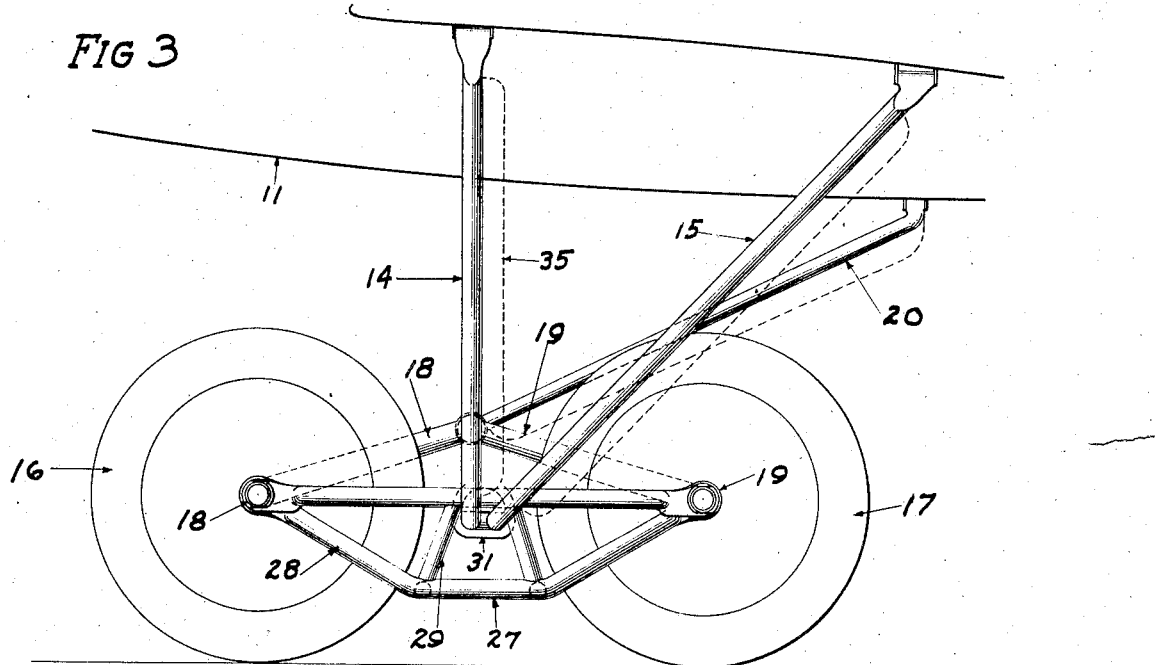
Figure 3, is a detail side elevation of one of the pairs of tandem wheels and the strut mounting provided for their support.
Figure 4:
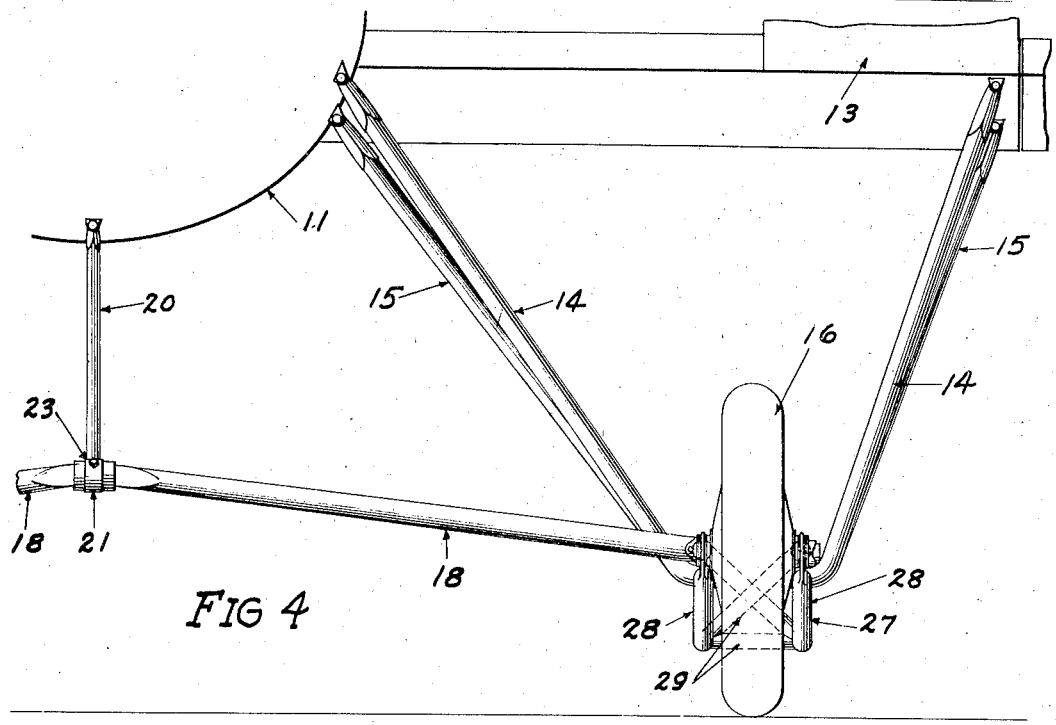
Figure 4, is an enlarged front elevation of the landing gear showing the manner in which one of the pairs of tandem wheels is supported.

The forward V-strut of each tandem pair herein provided is designated as 14 and the rear V-strut of each tandem pair is designated herein as 15. As illustrated in Figure 3 the struts 14 and 15 converge downwardly and at the bight portions thereof lie closely adjacent. At their upper ends the struts are pivoted about axes which extend fore and aft to thus admit of lateral displacement of the landing gear wheels, due either to an improper landing or a landing upon rough or uneven ground.

The wheels of the landing gear, like the struts 14 and 15 are likewise arranged in tandem pairs, the tandem pairs being widely spaced and situated preferably between the longitudinal vertical plane of the fore and aft axes of the side motor and the longitudinal vertical plane of the fore and aft axis of the center motor. Such an arrangement would naturally follow in consequence of the V-arrangement of the struts. The forward wheels of the tandem pairs are designated as 16 and the rear wheels of the tandem pairs as 17.

Axles 18 and 19 are provided for the individual support of the respective tandem wheels. These axles, of which there are four, may be designated as out-rigged axles since at their inner ends they are pivoted to a center strut 20 hung from the fuselage or body. The center strut 20 is also a V-strut (see Fig. 5) and at its lower end is provided with an integral sleeve or ferrule 21. Within the sleeve an interiorly channeled block 22 is mounted, the block being held in place by a bolt 23 which extends diagonally through the sleeve or ferrule. Within the channels of the block 22 the flanged ends 24 of fittings 25' are fitted. These fittings 25' are slotted and are free to rotate in the sleeve or ferrule though held by the flanges 24 against lateral displacement. It is into the slots of these fittings that the inner ends of the outrigged axles 18 and 19 are extended. Since the axles 18 and 19 are articulated and since the fittings 25' are free to rotate in the sleeve or ferrule, obviously, the tandem wheels which are carried by the outrigged axles may be simultaneously vertically displaced or displaced vertically one independently of the other. The connections between the outrigged axles 18 and 19 and the fittings 25' are pivoted connections and have been designated as 26, (see Fig. 9). The center strut 20, it should be noted, is also pivoted to the fuselage or body, the pivot connection extending in a fore and aft direction to admit of lateral displacement of the landing gear in its entirety as herein before mentioned.

At the outer ends of the axles 18 and 19 rocker frames 27 are supported, one rocker frame being provided for each pair of tandem wheels. Each rocker frame comprises connected side sections 28 having apertured ends through which the axles 18 and 19 are carried. The axles, closely adjacent to the inner side sections of the rocker frames, are bent, and from the inner side sections begin to converge inwardly. From one to the other of the side sections of the rocker frame the axles 18 and 19 are straight and with the side sections of the rocker frames may be said to describe successive right angles.

The side sections, intermediately of their ends are tied together and each rocker frame made a unit structure by a series of diagonal, vertical and lateral braces 29. One of these braces, as distinguished from the remaining number, is made extra heavy. This particular brace, designated as 30, extends from one to the other of the rocker frame sections midway the ends thereof, and it is over and under this extra heavy brace that the shock absorber elastics 31 are laced. But one group of shock absorber elastics is provided for each pair of tandem wheels.

Directly beneath the cross braces 30 and the rocker frames 27 the bight portions of the tandem struts 14 and 15 are brought together. The bight portions, it will be noted, parallel the cross braces 30 and the shock absorber elastics 31 tie the bight portions and the cross braces together. The bight portions of the tandem struts jointly support fillers 32 which in turn support rebound elastics 33 interposed between the cross braces and the bight portions of the tandem struts. Fore and aft displacement of the tandem V-struts is prevented by the vertical braces 29 of the series of braces above mentioned. The vertical braces 29 it will be noted (see Fig. 7) act as stops since they are disposed respectively fore and aft of and lie closely adjacent to the bight portions of the struts.

The mounting of the rocker frames 27 upon the outrigged axles 18 and 19 and the grouping of the shock absorber elastics midway the ends of the rocker frames permit the tandem wheels of the respective pairs to yield either independently or together. If displaced against tension of the elastics independently of each other one or the other of the axles of the tandem wheels define the axis about which the rocker frame is rocked. For instance, if in operating on rough or uneven ground, the forward wheel of one of the tandem pairs should encounter an obstruction it will immediately yield, with the axle of the following wheel defining the axis about which the forward wheel swings. The result is, the elastics due to their location, will be displaced but one-half the distance of the forward wheel displacement. Moreover, the weight of the machine will also be equally distributed on all of the wheels, regardless of which wheel or wheels is displaced.

The resistance of the landing gear is minimized not only by the arrangement of the wheels in tandem but by the provision of housings 34 of approximate streamline form which enclose the wheels in pairs. These housings may be made either of aluminum or other light metal and are so designed as to move with the wheels by extending the ends of the outrigged axles through apertures formed in the housings. To further decrease resistance of the landing gear, the exposed struts may be streamlined, if desired, by fairing 35.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. In a landing gear for aircraft, a rigid rocker frame comprising connected side sections, a support for and about which the rocker frame is adapted to yield bodily as well as pivot, and wheels mounted in tandem between the side sections of said frame.

2. In a landing gear for aircraft including a supporting strut, a rocker frame comprising connected side connections, a yielding connection between the rocker frame and strut comprising one or more shock absorber elastics grouped about the connections between the side sections, axles mounted at the ends of the rocker frame, and wheels mounted on the axles between the side sections respectively fore and aft of the yielding connections.

3. In a landing gear for aircraft, the combination with the fuselage or other aeroplane body, of wheels mounted in tandem respectively beneath and at opposite sides of the fore and aft axis of the body, struts extended downwardly from the body on opposite sides thereof for the support of the tandem wheels, a rigid rocker frame mounted at the foot of each group of struts, a yielding connection between each rocker frame and its associated group of struts, and pivoted axles laterally extended out from opposite sides of the body, the axles on opposite sides of the body being rigidly fastened to the corresponding rocker frames, each axle carrying at its outer end one of the tandem wheels.

4. In a landing gear for aircraft, the combination with the fuselage or other aeroplane body, of wheels mounted in tandem respectively beneath and at opposite sides of the fore and aft axis of the body, pivoted V-struts extended outwardly and downwardly from the body on opposite sides thereof for the support of the tandem wheels, a rigid rocker frame extended in a fore and aft direction and mounted at the foot of each V-strut, a yielding pivot connection between each rocker frame and its associated V-strut, a pivoted center strut extended downwardly from the aeroplane body, and outrigged axles pivoted to the center strut and extended laterally in opposite directions therefrom, the axles on opposite sides of the body being outwardly divergent and fastened to the corresponding frames, each axle carrying at its outer end one of the tandem wheels.

5. In a landing gear for aircraft, the combination with the fuselage or body and the supporting surfaces therefor, of wheels mounted in tandem respectively beneath and at opposite sides of the fore and aft axis of the body, V-struts extended downwardly and outwardly from the body on opposite sides thereof, V-struts extended downwardly and inwardly from the supporting surfaces at points laterally removed from the body, the separate groups of V-struts at opposite sides of the body being arranged to jointly support the tandem wheels, a rigid rocker frame mounted at the foot of each group of struts, a yielding connection between each rocker frame and its associated group of struts, and downwardly divergent outrigged axles supported beneath the body, the divergent ends of the respective axles being rigidly fastened to the opposite rocker frames, each axle at its outer end supporting one of the tandem wheels.

6. A landing gear for aircraft including separate V-struts positioned respectively one in advance of the other, a rocker frame carried jointly by the V-struts, a yielding connection between the rocker frame and both V-struts, and wheels carried by the rocker frame respectively fore and aft of the yielding connections.

7. A landing gear for aircraft including separate V-struts having their bight portions brought together, a rocker frame carried jointly by the V-struts, a yielding connection between the rocker frame and V-struts comprising a unit group of shock absorber elastics laced for contact with both bight portions of the V-struts and with the rocker frame, and tandem wheels carried by the rocker frame respectively fore and aft of the yielding connections.

8. In a landing gear for aircraft, the combination with the fuselage or other aeroplane body, of wheels mounted in tandem pairs respectively and at opposite sides of the fore and aft axis of the body, separate V-struts likewise arranged in pairs at opposite sides of the fore and aft axis of the body, a rocker frame mounted at the foot of each pair of V-struts for the support of the tandem wheels, yielding connections respectively between the rocker frames and the pairs of V-struts, the yielding connections in each instance being intermediately located between the wheels of the tandem pairs, and outrigged axles pivoted at their inner ends to the fuselage or body, one of the outrigged axles being provided for each of the tandem wheels.

In testimony whereof we hereunto affix our signatures.

WILLIAM L. GILMORE.
HARVEY C. MUMMERT.